United States Patent [19]
Nelson

[11] Patent Number: 5,203,280
[45] Date of Patent: Apr. 20, 1993

[54] RAPID EXIT HERRINGBONE STALL

[75] Inventor: William S. Nelson, Sun Prairie, Wis.

[73] Assignee: DEC International, Inc., Madison, Wis.

[21] Appl. No.: 813,102

[22] Filed: Dec. 23, 1991

[51] Int. Cl.$^5$ .............................................. A01K 1/12
[52] U.S. Cl. .................................... 119/14.03; 119/27
[58] Field of Search ................... 119/14.03, 27, 147.1, 119/148, 14.04, 98, 99

[56] References Cited
U.S. PATENT DOCUMENTS

| | | | |
|---|---|---|---|
| 2,092,440 | 9/1937 | Cain | 119/14.04 |
| 3,921,586 | 11/1975 | Sweeney et al. | 119/14.04 |
| 4,715,321 | 12/1987 | Vandenberg et al. | 119/14.03 |
| 4,951,608 | 8/1990 | Keisgies et al. | 119/14.03 |
| 4,977,856 | 12/1990 | Norwood | 119/14.03 |

FOREIGN PATENT DOCUMENTS

| | | | |
|---|---|---|---|
| 2516279 | 10/1976 | Fed. Rep. of Germany | 119/27 |
| 3639840 | 6/1987 | Fed. Rep. of Germany | 119/14.03 |
| 2305125 | 10/1976 | France | 119/27 |
| 2565778 | 12/1985 | France | 119/14.03 |

*Primary Examiner*—Gene Mancene
*Assistant Examiner*—Todd E. Manahan
*Attorney, Agent, or Firm*—Andrus, Sceales, Starke & Sawall

[57] ABSTRACT

A herringbone-type milking parlor of the type in which the cow is milked from the side utilizes a rotating gate that moves from a horizontal exit position to a vertical position to urge the cow to exit from the milking stall. The gate stays in this position until a new cow has moved into the milking stall, at which time the gate indexes back to a position short of vertical to engage the brisket of the cow and move it gently back towards the rump rail and into a proper milking position.

7 Claims, 3 Drawing Sheets

RAPID EXIT HERRINGBONE STALL

BACKGROUND OF THE INVENTION

This invention relates in general to the field of cattle stalls and more specifically to milking parlors having a unique and efficient entry and exit system.

A milking parlor generally consists of an array of individual stalls, each designed to hold a cow while she is being milked. An attendant or operator is usually required to be present at the parlor to perform such tasks as ensuring that the animals are properly situated in the stalls; washing the udders prior to milking; applying the milking unit; and monitoring and attending to the operation of the milking units.

In earlier prior art milking parlors, cows were placed in rectangular-shaped stalls arranged in either an end to end configuration or side by side (serial configuration). Subsequently, an improvement to the serial configuration was made by disposing the stalls in an angular configuration or the so-called herringbone configuration.

In the herringbone configuration, the milking parlor attendant works in a centrally located operator pit. With milking parlors of this type, it is important that the cows have room to move into the individual milking stalls and that they be moved into position against the rump rail to facilitate the milking procedure.

It is also important that once the milking has taken place, that the cows can be exited from the parlor as quickly as possible.

In the past, rotary reels moved to an exit position, but did nothing to urge the cows out of the milking stall. This resulted in cows languishing behind in the milking stalls, thus preventing the introduction of a new batch of cows into the parlor.

Prior art reel gates also did not assist in positioning the cow in the stall.

SUMMARY OF THE INVENTION

It is an object of the present invention to provide an apparatus that overcomes the problems associated with the prior art reel gates.

In accordance with one aspect of the invention, the milking parlor is provided with a reel gate that rotates to a horizontal position to allow exit of the cow and then continues to move to a vertical position to urge the cow out of the stall and provide room for the entry of a new cow.

In accordance with another aspect of the invention, once a cow has moved into the milking stall, the reel reverses to a position short of vertical to engage the cow and move the cow rearwardly into contact with a rump rail so that the cow is correctly positioned for the milking process.

The present invention thus provides a milking parlor that provides adequate room for the entry of the cows into the milking stalls and which assists in the positioning of the cows for the milking procedure. The invention also provides for a rapid exit for the cows once the milking process has been completed and an apparatus that urges the cow to exit the milking stall.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
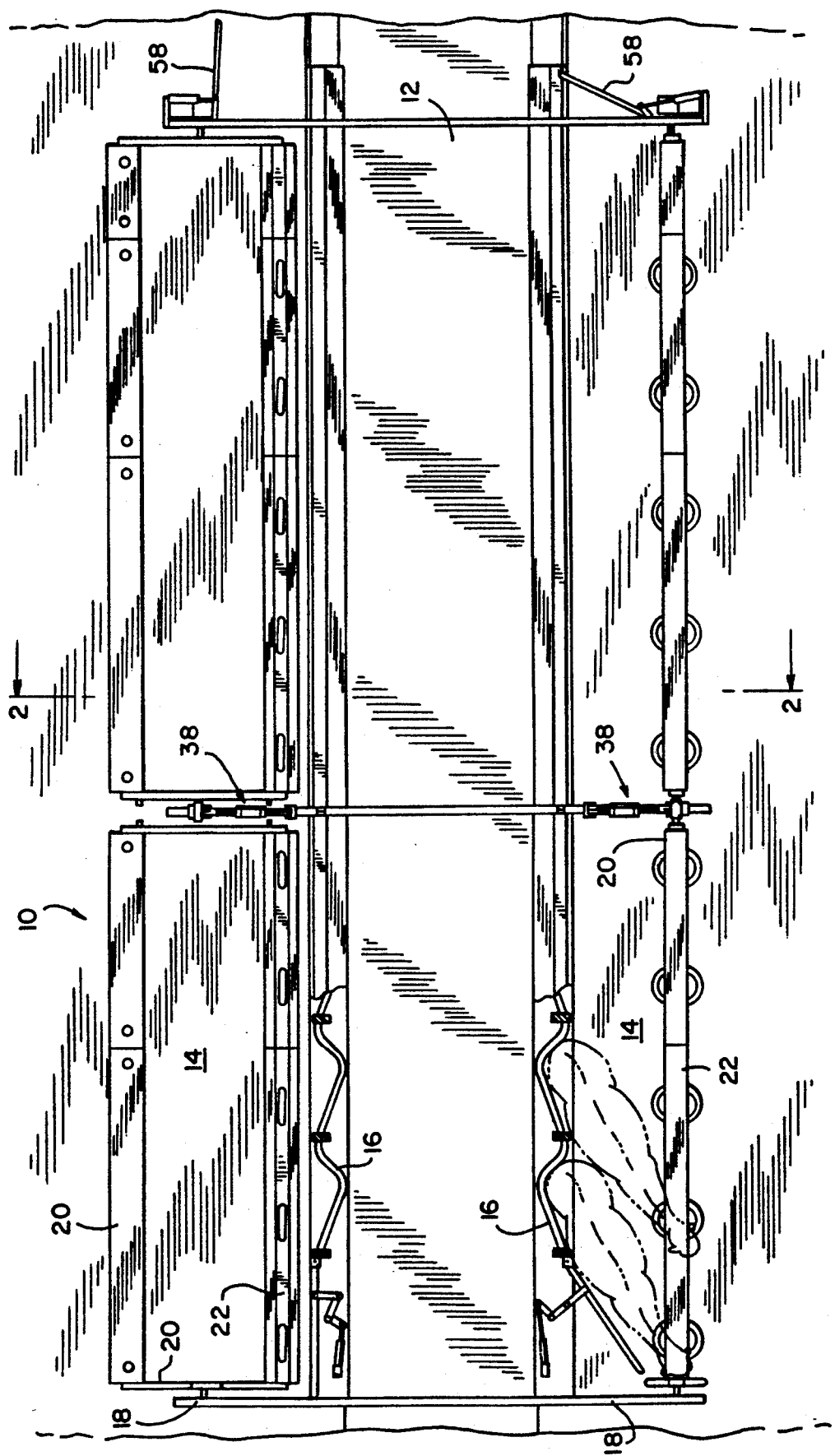
FIG. 1 is a plan view of a milking parlor according to the present invention.
Figure 2:
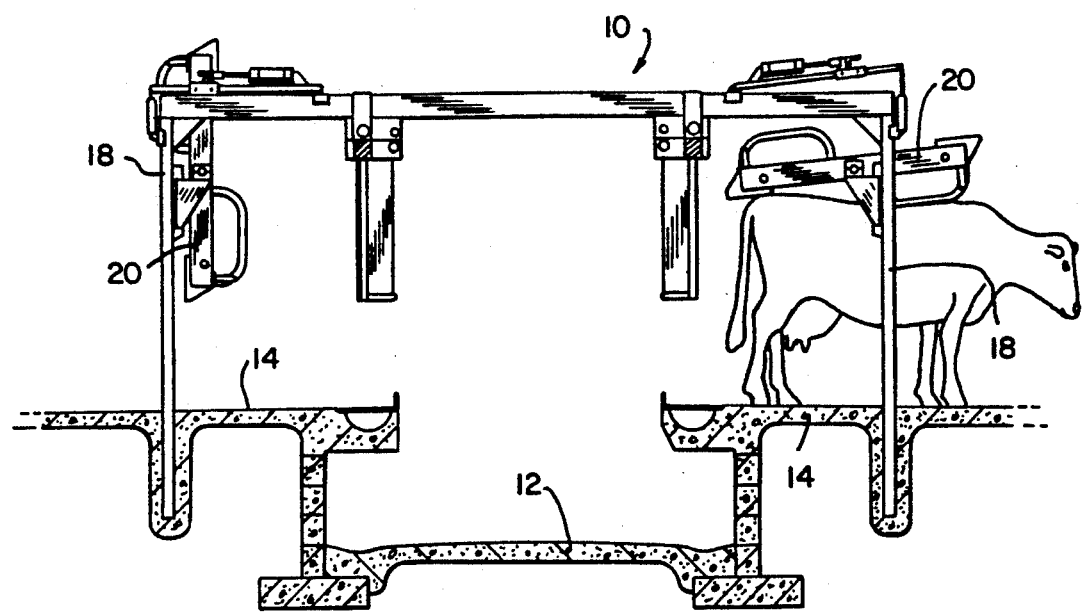
FIG. 2 is a cross-sectional view taken along the line 2—2 of FIG. 1.

FIGS. 1 and 2 illustrate a milking parlor 10 of the type having a centrally located operator pit 12 with cow stands or platforms 14 disposed on either side. An annularly disposed milking stall is defined by a herringbone rump rail 16 and cow restraining framework 18 on which an elongated rotating gate 20 is disposed.

Figure 5:
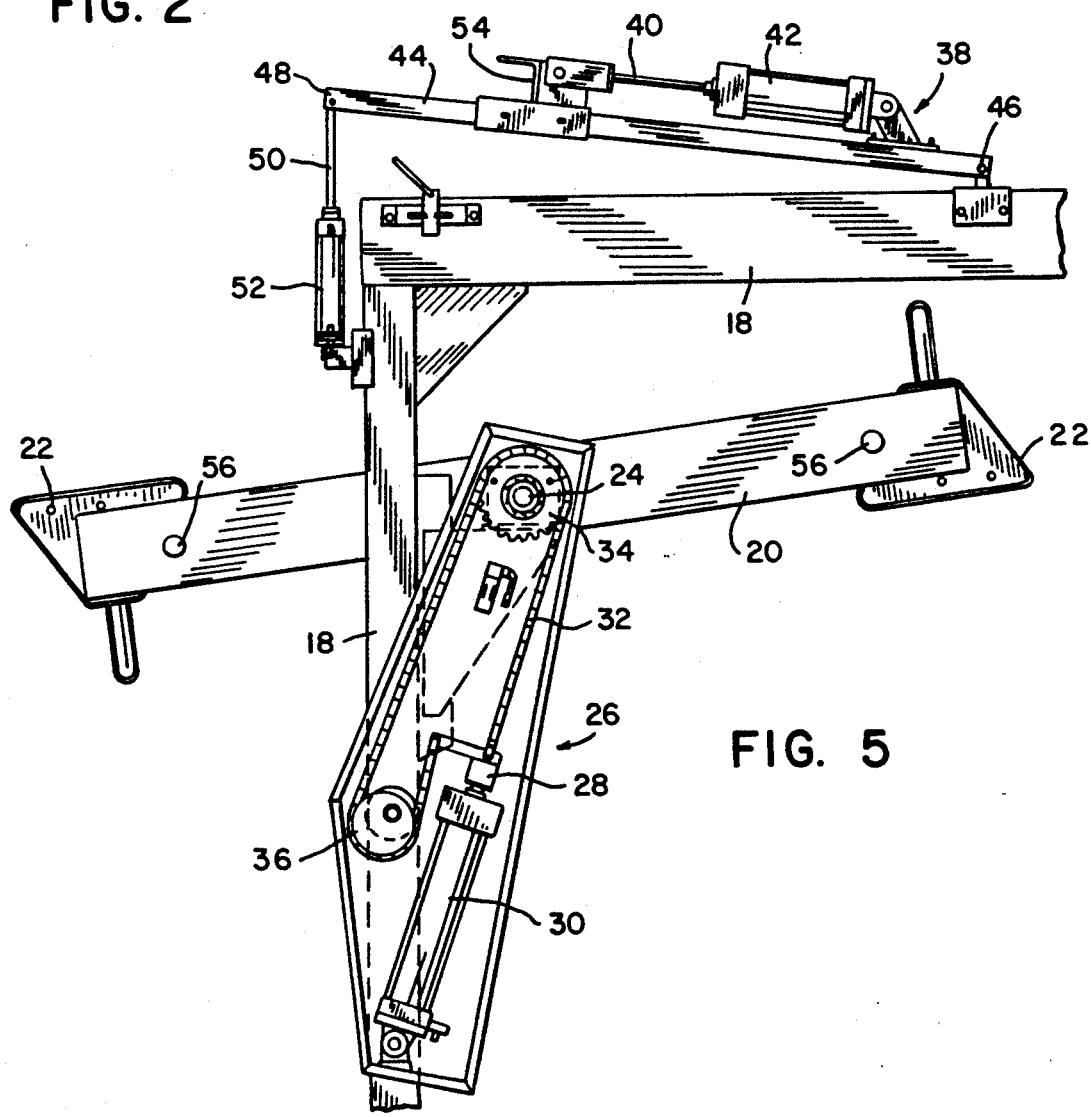
FIG. 5 is a view similar to FIG. 3 with the reel shown in the exit position.
Figures 3, 4:
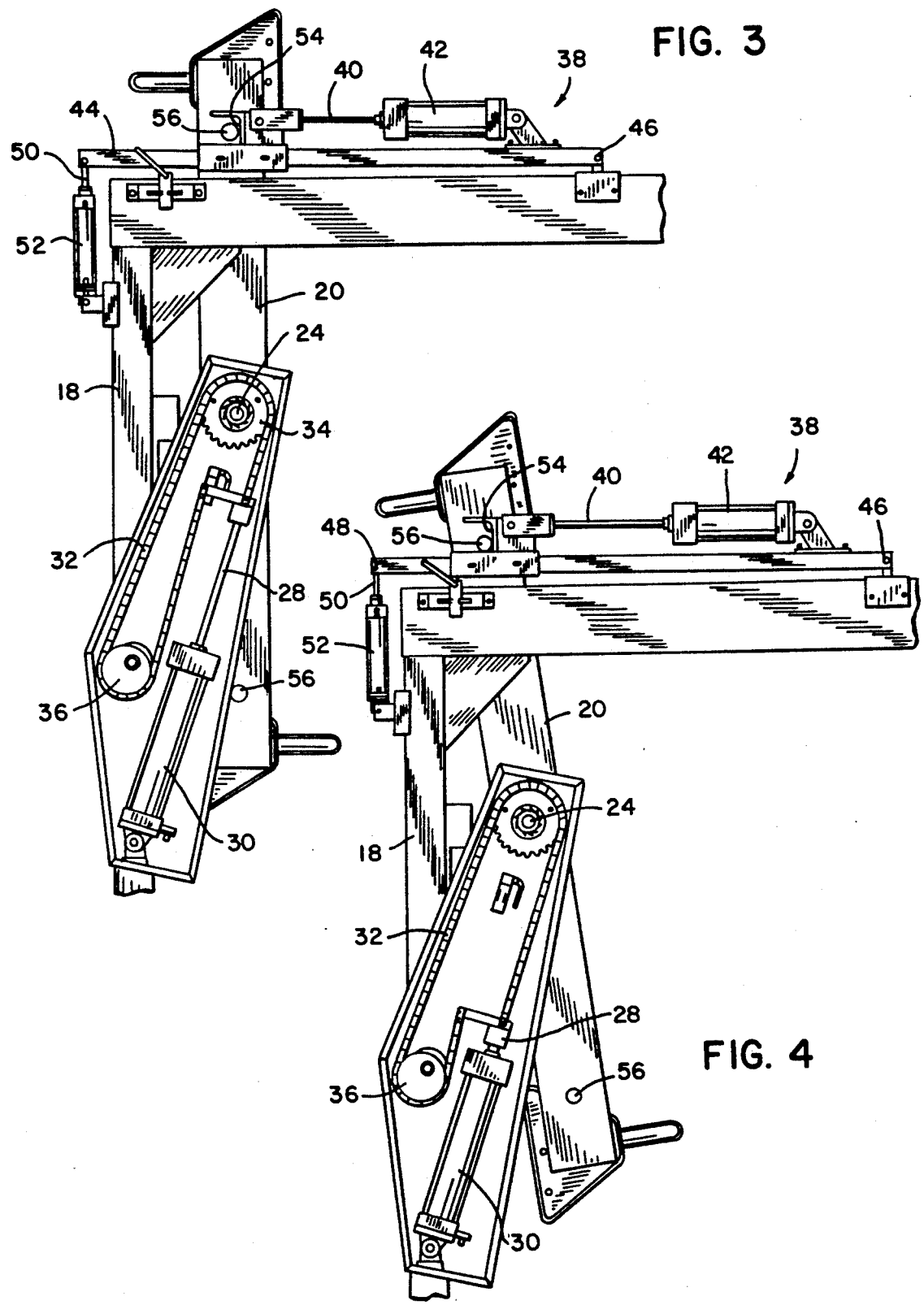
FIG. 3 is an enlarged cross-sectional view of the drive mechanism and reel with the reel shown in the entry position.
FIG. 4 is a view similar to FIG. 3 with the reel shown in the milking position.

As seen in FIGS. 3–5, elongated gate portion 20 includes a pair of elongated rails 22 disposed at opposite ends of gate 20 and having their longitudinal axis perpendicular to that of elongated gate portion 20. Elongated gate portion 20 is mounted for rotation on axis 24.

A drive means 26 consists of a rod 28 mounted within a cylinder 30 along with a chain 32 attached to rod 28 and disposed about gear 34 and idler 36. Drive means 26 is designed so that gear 34 will rotate freely when rod 28 is extended and will engage axis 24 when rod 28 is retracted so as to cause rotational movement of gate 20 in a clockwise motion in FIGS. 3-5.

Rotating gate 20 is also provided with a locking and indexing mechanism 38 consisting of a rod 40 and cylinder 42 mounted on a base plate 44. Base plate 44 has one end 46 pivotally attached to framework 18 and the other end 48 connected to the rod 50 of cylinder 52 which is mounted to a vertical surface of framework 18.

As seen in FIGS. 3 and 4, rod 40 is provided with a surface 54 that engages an abutment on gate 20 in the form of pin 56. When surface 54 is in engagement with pin 56, further clockwise rotation of gate 20 is prevented. As seen in FIG. 4, extension of rod 40 causes surface 54 to engage pin 56 and slightly rotate gate 20 in a counterclockwise direction. Surface 54 then remains in contact with pin 56 to prevent clockwise rotation of gate 20.

In order to release locking and indexing mechanism 38, rod 50 is extended causing upward rotational movement of base plate 44 which removes surface 54 from the rotational path of pin 56.

In operation, cows enter milking parlor 10 through cylinder activated gates 58 disposed at one end of milking parlor 10. At this time, gate 20 is in the substantially vertical position shown in FIG. 3. Once the cows are positioned along cow stand 14, rod 40 on indexing mechanism 38 extends so that gate 20 is pivoted slightly in a counterclockwise direction to engage the cow and urge the cow rearwardly into engagement with rump rail 16.

Once the milking procedure is completed, rod 50 of cylinder 52 is extended to move locking and indexing mechanism 38 to an elevated position and drive means 26 rotates gate 20 to a horizontal position so that the cows may exit platform 14. Drive means 26 is provided with an element of lost motion so that gate 22 hesitates briefly in the horizontal position and then continues to rotate in a clockwise direction so that rail 22 will engage the rump of the cow and urge the cow to continue its exit from platform 14. This rotational movement will continue until gate 20 is in a substantially vertical position (FIG. 3). Rod 50 retracts so as to lower locking and indexing mechanism 38 and a new batch of cows is then introduced into platform 14. Once the new cows are in position, gate 20 is once again indexed in a counter-clockwise direction to urge the cows rearwardly into engagement with rump rail 16.

Various modes of carrying out the invention are contemplated as being within the scope of the following claims particularly pointing out and distinctly claiming the subject matter regarded as the invention.

I claim:

1. A milking parlor entry/exit system for use in a parlor having a herringbone configuration in which the cows are angularly disposed in stalls defined by a herringbone rump rail and cow restraining framework in which the milking is done from the side of the cow's legs, said system comprising:
   an elongated rotating gate disposed on the framework and movable in a rotational manner and having elongated rails disposed at opposite ends of the gate,
   motive means for moving said gate from a first substantially vertical position to a first substantially horizontal position in which said rails do not obstruct the cow and the cow is allowed to exit from the milking stall,
   said motive means also rotating said gate from said substantially horizontal position to a second substantially vertical position so that one of said elongated rails engages the rump of the cow and urges the cow to exit the stall, with said rotational movement between said first substantially vertical position and said second substantially vertical position being substantially continuous with a hesitation in the movement at said first substantially horizontal position, and
   means for reversing the movement of said gate so that said gate returns to a third position short of vertical and one of said elongated rails engages the cow and urges said cow rearwardly toward said rump rail.

2. The system defined in claim 1 wherein said means for rotating said gate to said first and second positions comprises a rod and cylinder actuated chain drive in which retraction of the rod causes said gate to rotate.

3. The system defined in claim 1 wherein said means for reversing said gate movement comprises a rod and cylinder with said rod having a surface engageable with an abutment on said gate so that extension of said rod rotates said gate in a reverse direction.

4. The system defined in claim 1 wherein said reversing means includes means to prevent movement of said gate from said third position to said second position.

5. The system defined in claim 4 wherein said locking means comprises a rod and cylinder with said rod having a surface engageable with an abutment on said gate to prevent movement of said gate.

6. The system defined in claim 5 further comprising release means for disengaging said rod surface from said gate abutment.

7. The system defined in claim 6 wherein said rod and cylinder are mounted on an elongated base plate having one end pivotally mounted to the framework and said release means comprises a rod and cylinder attached to the framework with the rod connected to the other end of said base plate so that extension of said rod causes pivotal movement of said base plate whereby said locking means rod surface is moved out of engagement with said gate abutment.

* * * * *